United States Patent
Young et al.

(10) Patent No.: US 12,346,005 B2
(45) Date of Patent: Jul. 1, 2025

(54) AUTOMOTIVE CAMERA WITH IMPROVED HOUSING ALIGNMENT

(71) Applicant: Connaught Electronics Ltd., Tuam (IE)

(72) Inventors: Patrick Young, Tuam (IE); Blain Prendergast, Tuam (IE); Sean Mcgreevy, Tuam (IE)

(*) Notice: Subject to any disclaimer, the term of this patent is extended or adjusted under 35 U.S.C. 154(b) by 152 days.

(21) Appl. No.: 18/180,412

(22) Filed: Mar. 8, 2023

(65) Prior Publication Data

US 2023/0288782 A1   Sep. 14, 2023

(30) Foreign Application Priority Data

Mar. 8, 2022   (DE) .......................... 102022105422.5

(51) Int. Cl.
*G03B 17/02*   (2021.01)
*B23K 26/24*   (2014.01)

(52) U.S. Cl.
CPC .............. *G03B 17/02* (2013.01); *B23K 26/24* (2013.01)

(58) Field of Classification Search
None
See application file for complete search history.

(56) References Cited

U.S. PATENT DOCUMENTS

| | | | | |
|---|---|---|---|---|
| 8,482,664 B2* | 7/2013 | Byrne | ..................... | B60R 11/04 348/148 |
| 9,160,908 B2* | 10/2015 | Mori | ...................... | H04N 23/51 |
| 10,250,784 B2* | 4/2019 | Minikey, Jr. | ........... | H04N 23/51 |
| 10,442,369 B2* | 10/2019 | Hehir | ....................... | B60R 11/04 |
| 10,707,567 B2* | 7/2020 | Grimes | .................... | B60R 11/04 |
| 10,917,548 B2* | 2/2021 | Sesti | ....................... | G02B 7/025 |
| 10,935,873 B2* | 3/2021 | Nakamura | ............... | H05K 9/00 |
| 11,221,543 B2* | 1/2022 | Park | ......................... | H05B 3/84 |
| 11,240,411 B2* | 2/2022 | Byrne | ..................... | H04N 23/51 |
| 2010/0097519 A1 | 4/2010 | Byrne et al. | | |

(Continued)

FOREIGN PATENT DOCUMENTS

| | | | | |
|---|---|---|---|---|
| CN | 112616010 A | * | 4/2021 | ............. H04N 23/51 |
| DE | 102010003955 A1 | | 10/2011 | |

(Continued)

OTHER PUBLICATIONS

Extended European Search Report issued in European Application No. 23157933.5 mailed on Jul. 28, 2023 (10 pages).

(Continued)

*Primary Examiner* — Rodney E Fuller
(74) *Attorney, Agent, or Firm* — Osha Bergman Watanabe & Burton LLP (57) ABSTRACT

An automotive camera (2) comprises a first housing part (5) and a lens unit (4), which is connected to the first housing part (5) at a lens opening (10) and a second housing part (8), which is connected to the first housing part (5) at a flange (6) of the first housing part (5), which surrounds the lens opening (10) forming a step structure (9) comprising four side faces (11a, 11b, 12a, 12b), which are oriented away from the lens opening (10). The second housing part (8) is in contact with a first side face (11a) of the four side faces (11a, 11b, 12a, 12b) and the second housing part (8) is in contact with a second side face (11b) of the four side faces (11a, 11b, 12a, 12b), which is perpendicular to the first side face (11a).

12 Claims, 3 Drawing Sheets

(56) References Cited

U.S. PATENT DOCUMENTS

2016/0191863 A1 6/2016 Minikey, Jr. et al.
2018/0098033 A1* 4/2018 Mleczko ................. B60R 1/088
2021/0318507 A1 10/2021 Oh

FOREIGN PATENT DOCUMENTS

| DE | 202020105844 U1 | 10/2020 | | |
|----|----|----|----|----|
| KR | 20190027078 A | 3/2019 | | |
| WO | WO-2017082617 A1 * | 5/2017 | ............. | G02B 17/02 |
| WO | WO-2018054426 A1 * | 3/2018 | ............. | G02B 27/62 |
| WO | WO-2018066911 A1 * | 4/2018 | ............. | G03B 17/02 |
| WO | 2019-164724 A1 | 8/2019 | | |
| WO | WO-2021096337 A1 * | 5/2021 | ............. | G03B 17/12 |

OTHER PUBLICATIONS

German Search Report in corresponding German Application No. 10 2022 105 422.5, dated Nov. 17, 2022 (7 pages).

* cited by examiner

AUTOMOTIVE CAMERA WITH IMPROVED HOUSING ALIGNMENT

The present invention is directed to an automotive camera comprising a first housing part and a lens unit, which is connected to the first housing part at a lens opening of the first housing part, a second housing part, which is connected to the first housing part, such that a housing interior is formed, and a circuit board, which is arranged within the housing interior, wherein the second housing part is connected to the first housing part at a flange of the first housing part, which surrounds the lens opening such that a step structure surrounding the lens opening is formed at an outer contour of the first housing part, wherein the step structure comprises four side faces, which are oriented away from the lens opening. Furthermore, the invention is directed to a motor vehicle and a method for manufacturing an automotive camera.

Cameras, which are designed to be arranged on motor vehicles, may be denoted as automotive cameras. Automotive cameras depicting an exterior environment of the motor vehicle are used for various driver assistance functions or other functions for partially or fully automatic driving of a motor vehicle. However, automotive cameras may also be employed for the capturing an interior of the vehicle and may be arranged correspondingly. Thus, automotive cameras may be exposed to significant temperature fluctuations and/or other environmental conditions. Moreover, automotive cameras are also exposed to mechanical stress due to the vibrations while the vehicle is moving. Automotive cameras for motor vehicles should therefore be designed to operate as desired under said conditions and to achieve sufficiently good image quality. The images may then be provided to driver assistance systems or other electronic vehicle guidance systems, which may use them as an input for driver assistance or at least partly automatically guiding the vehicle.

The alignment of the first and the second housing part of automotive cameras as mentioned above may be important for a reproducible and robust connection process to connect the first and the second housing part to each other.

It is an objective of the present invention to improve the alignment of housing parts of an automotive camera with respect to each other.

This objective is achieved by the respective subject matter of the independent claims. Further implementations and preferred embodiments are subject matter of the dependent claims.

The invention is based on the idea to design the first and the second housing part such that a lateral contact is made between an inner surface of the second housing part and two perpendicular side faces of a step structure surrounding the lens opening of the first housing part. In this way, while tolerances can still be accepted on the remaining two side faces of the step structure, at the same time an accurate alignment of the two housing parts during manufacturing or when connecting the housing parts to each other is achieved.

According to an aspect of the invention an automotive camera is provided. The automotive camera comprises a first housing part and a lens unit, which is connected to the first housing part at a lens opening of the first housing part. The automotive camera also comprises a second housing part, which is connected to the first housing part, such that a housing interior or assembly space is formed. The automotive camera comprises a circuit board, which carries for example an imager chip, which is arranged within the housing interior. The second housing part is connected to the first housing part at a flange of the first housing part, which surrounds the lens opening such that a step structure surrounding the lens opening is formed at an outer contour of the first housing part. The step structure comprises four side faces, each of them being oriented away from the lens opening or in other words are facing in outwards direction. The second housing part is in contact with a first side face of the four side faces and the second housing part is in contact with a second side face of the four side faces. In particular, an interior surface of the second housing part facing the assembly space is in contact with the first and the second side face. Therein, the first side face is perpendicular to the second side face.

The housing interior may be understood as an enclosure formed by the first housing part in combination with the second housing part. The first and the second housing part may for example form a housing body of the automotive camera. The first housing part may also be denoted as front housing body or as lens holder body. The lens unit may comprise a lens housing as well as one or more lenses inside the lens housing. For fastening the lens unit to the first housing part, the lens housing may for example be connected to the first housing part by means of a threaded connection, for example by using an external thread of the lens housing and an internal thread of the first housing part or vice versa. The second housing part may also be denoted as rear housing body.

The lens unit or, in other words, the one or more lenses, comprises an optical axis. The optical axis is, in particular, parallel to a longitudinal axis of the lens opening. Consequently, a flange surface may be perpendicular to the optical axis and the four side faces may be parallel to the optical axis as well as the inner surface of the second housing part, which is in contact with the first and the second side face.

In particular, the flange extends radially with respect to the optical axis or the longitudinal axis of the lens opening, respectively. Here and in the following, the expressions radial and axial refer to the optical axis or the longitudinal axis of the lens opening, respectively, if not stated otherwise.

In other words, the flange extends in a direction perpendicular to the optical axis and therefore a flange surface of the flange facing the second housing part, is perpendicular to the optical axis as well.

A basic shape of the step structure is, in particular, rectangular or quadratic. In other words, the first and the second side face are neighboring side faces, which are perpendicular to each other. Analogously, a third side face and a fourth side face of the four side faces are two further neighboring side faces, which are perpendicular to each other. Therein, the third side face may for example be parallel to the first side face and the fourth side face may be parallel to the second side face.

It is noted that the side faces are not necessarily completely plane faces. In particular, they may or may not comprise one or more protrusions, ribs et cetera. In this case, the protrusions or ribs may for example be in contact with the second housing part and may be considered as a part of the respective side face.

The step structure may for example be formed by or consist of the flange surface and the four side faces perpendicular to the flange surface.

The first and the second housing part may for example be connected to each other by means of welding, for example laser welding, in particular at the flange or the flange surface.

In particular, a surface of the second housing part perpendicular to the inner surface of the second housing part and facing the first housing part may be in contact with the flange surface and may be laser welded with the flange surface.

Since the first side face and the second side face are in contact with the second housing part and are perpendicular to each other, a unique alignment in the plane perpendicular to the optical axis of the first and the second housing part with respect to each other may be achieved when assembling the automotive camera. In particular, before connecting the first and the second housing part to each other, the flange surface may be brought into contact with the second housing part and the first housing part and the second housing part may be shifted with respect to each other within a plane perpendicular to the optical axis until the contact of the first and the second side face with the second housing part is established. Afterwards, the first housing part and the second housing part may be connected to each other, for example by laser welding.

In this way, the uncertainty of the positioning of the housing parts with respect to each other in the direction perpendicular to the optical axis may be minimized. This has the advantage that the outer surface of the camera body formed by the first and the second housing part may be manufactured such that there is no step or protrusion at the connecting region due to misalignment. In particular, the quality of the laser welding or another connection process, can be improved in this way by achieving a reproducibly no or only a very small offset between the housing parts. The result of the connection process is therefore more reproducible and reliable.

According to several implementations of the automotive camera, a spacing is present between the second housing part, in particular the inner surface of the second housing part and the third side face of the four side faces. A further spacing is present between the second housing part, in particular the inner surface of the second housing part, and the fourth side face of the four side faces. Therein, the fourth side face is perpendicular to the third side face.

The spacing may also be denoted as a lateral distance or clearance. In particular, the presence of the spacing allows for certain tolerances when manufacturing the first housing part and the second housing part before they are connected to each other as described above. In other words, since no clearance is present between the first side face and the second housing part and also no clearance is present between the second housing part and the second side face, the tolerances in the directions perpendicular to the optical axis may be absorbed by the spacing between the second housing part and the third side face and the fourth side face, respectively.

According to several implementations, a first wall thickness of the first housing part between the first side face and the lens opening is greater than a third wall thickness of the first housing part between the third side face and the lens opening.

The first wall thickness corresponds to the distance between the inner side of the lens opening and the contact area between the first side face and the second housing part. The same holds analogously for the third wall thickness, which is therefore given by a distance between the inner surface of the lens opening and the spacing.

In other words, the distance between the optical axis and the contact area of the first side face and the second housing part is greater than the distance between the optical axis and the spacing at the third side face.

The same may hold analogously for the other side faces. In particular, the first wall thickness may be greater than a fourth wall thickness of the first housing part between the fourth side face and the lens opening and/or a second wall thickness of the first housing part between the second side face and the lens opening may be greater than the third wall thickness and/or the second wall thickness may be greater than the fourth wall thickness.

The difference between the respective wall thicknesses may for example be smaller than one millimeter, for example smaller than 0.5 mm, for example smaller than 0.2 mm.

In other words, from a viewing direction parallel to the optical axis, the step structure surrounding the lens opening is not aligned exactly coaxially with the lens opening. In this way, it may be achieved that the first and the second side faces are in contact with the second housing part and the spacing as well as the further spacing are realized as described, while the outer dimensions of the housing body after connecting the first to the second housing part may still be symmetric.

According to some implementations, the first side face has a plane surface and/or the second side face has a plane surface. Also the third and/or the fourth side face may for example have respective plane surfaces.

In particular, a plane surface may be understood such that there are no ribs or protrusions in radial direction or grooves in radial direction in the respective side faces.

Consequently, the contact area between the second housing part and the first as well as the second side face may be particularly large. Furthermore, undercuts in the step structure may be avoided in this way such that the first housing part is particularly simple to be manufactured for example by means of an extrusion process or an injection molding process. Therefore, machining steps such as milling et cetera may be avoided.

According to alternative implementations, the step structure comprises a first protrusion feature at the first side face and the second housing part is in contact with the first side face at the first protrusion feature. Alternatively or in addition, the step structure comprises a second protrusion feature at the second side face and the second housing part is in contact with the second side face at the second protrusion feature.

In other words, the second housing part is in contact with the first and/or the second protrusion feature.

The protrusion features may for example also be denoted as ribs and may not necessarily extend along the whole respective side face.

The protrusion features have the advantage that they may be easily identified visually by manufacturing personnel, which may simplify handling during assembly.

According to several implementations, the first housing part and the second housing part are connected to each other by means of laser welding, in particular at a contact region between the flange or the flange surface, respectively, and the corresponding touching surface of the second housing part.

Consequently, the automotive camera has a welding seam surrounding the optical axis and the lens opening circumferentially at the position where the second housing part is connected to the first housing part.

According to several implementations, the first housing part consists of a metal and the second housing part consists of the metal or a further metal.

The metal and/or the further metal may for example be aluminum, magnesium, steel or another metal alloy.

In other implementations, the first housing part comprises a first metal component, which comprises the flange and the second housing part comprises a second metal component, wherein the second metal component is connected to the flange.

The metal component and the further metal component may for example comprise or consist of aluminum, magnesium, steel or another metal alloy.

According to a further aspect of the invention, a method for manufacturing an automotive camera, in particular an automotive camera according to the invention, is provided.

According to several implementations of the method, a first housing part, which comprises a lens opening for attaching a lens unit of the automotive camera to the first housing part, and a second housing part are connected to each other at a flange of the first housing part such that a housing interior is formed. The flange surrounds the lens opening such that a step structure surrounding the lens opening is formed at an outer contour of the first housing part, wherein the step structure comprises four side faces, which are oriented away from the lens opening. According to the method, the second housing part is brought into contact with a first side face of the four side faces and the second housing part is brought into contact with a second side face of the four side faces before the second housing part is connected to the first housing part. Therein, the second side face is perpendicular to the first side face.

The housing interior is, in particular, formed for arranging a circuit board of the automotive camera inside the housing interior. In some implementations of the method, the circuit board is arranged in the housing interior.

In other words, the first housing part is connected to the second housing part, for example by means of laser welding, only after the second housing part, in particular the inner surface of the second housing part, is brought into contact with the first side face and the second side face.

According to several implementations of the method, in order to bring the second housing part into contact with the first side face and the second side face, the first housing part and the second housing part are moved relative to each other within a plane, which is perpendicular to the first side face and to the second side face and, in particular, to the optical axis of the lens unit.

The lens unit may be fastened to the first housing part at the lens opening, for example by a threaded connection, before the first housing part is connected to the second housing part or afterwards.

According to several implementations, the first housing part and the second housing part are arranged with respect to each other, such that a spacing is present between the second housing part and a third side face of the four side faces and a further spacing is present between the second housing part and a fourth side face of the four side faces, wherein the fourth side face is perpendicular to the third side face.

In particular, when the second housing part is brought into contact with the first and the second side face as described above, the spacing and the further spacing are kept. This may, in particular, happen automatically once the second housing part comes into contact with the first and the second side face.

According to several implementations, the first housing part and the second housing part are connected to each other by means of laser welding.

In particular, a welding contour is given by the region of contact between the first and the second housing part. The laser welding process may for example be started at a position where the first side face or the second side face touches the second housing part. Then, the laser for laser welding may be guided along the welding contour until the starting point is reached again. Afterwards, the laser may be guided further such that a welding overlap region is formed, where the corresponding material portions of the first and the second housing part are welded twice.

In preferred embodiments, the welding overlap region lies completely in a region where the first side face or the second side face is in contact with the second housing part.

In particular, in implementations where the contact between the respective side face and the second housing part is established by a corresponding protrusion or rib of the respective side face, the laser welding overlap region lies fully within the region defined by the corresponding protrusion structure.

Consequently, the welding overlap region lies in a region within an increased wall thickness, which is beneficial for the welding process and the stability of the housing body.

In particular, in some implementations a first wall thickness of the first housing part between the first side face and the lens opening is greater than a third wall thickness of the first housing part between the side face and the lens opening and the laser welding is carried out along a contour of the flange, wherein the first wall thickness is present at a welding overlap region.

In particular, the first wall thickness is greater than the third wall thickness and the fourth wall thickness.

Alternatively, a second wall thickness of the first housing part between the second side face and the lens opening is greater than the third wall thickness and/or the fourth wall thickness and the laser welding is carried out along the contour of the flange, such that the second wall thickness is present at the welding overlap region.

According to several implementations, the first housing part is produced by means of an extrusion process or by means of a molding process, for example an injection molding process.

In such implementations, the first and the second side face are, in particular, manufactured as plane surfaces without the protrusion structures. Therefore, machining post-processing steps, such as milling, may be avoided.

Further implementations of the method for manufacturing an automotive camera according to the invention follow directly from the various implementations of the automotive camera according to the invention and vice versa. In particular, individual features and/or explanations with respect to the various implementations of the automotive camera according to the invention may apply analogously for respective implementations of the method according to the invention and vice versa.

According to a further aspect of the invention, a motor vehicle comprising an automotive camera according to the invention or a camera system according to the invention is provided.

Further features of the invention are apparent from the claims, the figures and the figure description. The features and combinations of features mentioned above in the description as well as the features and combinations of features mentioned below in the description of figures and/or shown in the figures may be comprised by the invention not only in the respective combination stated, but also in other combinations. In particular, embodiments and combinations of features, which do not have all the features of an originally formulated claim, are also comprised by the invention. Moreover, embodiments and combinations of features which go beyond or deviate from the combinations of features set forth in the recitations of the claims are comprised by the invention.

In the following, the invention will be explained in detail with reference to specific exemplary implementations and respective schematic drawings. In the drawings, identical or functionally identical elements may be denoted by the same reference signs. The description of identical or functionally identical elements is not necessarily repeated with respect to different figures.

In the figures.

Figure 1:
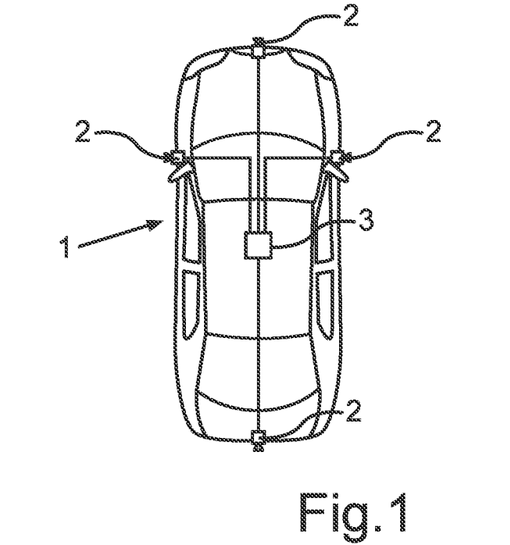
FIG. 1 shows schematically a motor vehicle with an exemplary implementation of an automotive camera according to the invention.

In FIG. 1, a motor vehicle 1 comprising at least one automotive camera 2, for example a front camera, side cameras and/or a rear camera, which is implemented according to an exemplary embodiment of the present invention is shown in a top view. Here, the motor vehicle 1 is formed as a passenger car. The motor vehicle 1 may for example comprise a control unit 3 to control the automotive cameras 2 and/or to receive camera images from them.

In the shown example, the motor vehicle 1 comprises four automotive cameras 2, which are distributed around the motor vehicle 1. One of the automotive cameras 2 is arranged in a rear area, one of the automotive cameras 2 is arranged in a front area of the motor vehicle 1 and the remaining two automotive cameras 2 are arranged in respective lateral areas, in particular in vicinities of the wing mirrors. The number and arrangement of the automotive cameras 2 may, however, be different in other examples. Alternatively or in addition, one or more automotive cameras according to the invention may be arranged for capturing an interior space or a passenger compartment of the motor vehicle 1.

The automotive cameras 2 are, in particular, installed to a respective individual motor vehicle component. The motor vehicle component may for example be a bumper or an exterior mirror or a side trim. The motor vehicle component may also be a headliner or an interior trim or a cover of a steering wheel center or an interior mirror. The mentioned motor vehicle components are to be considered only as non-limiting examples.

In an embodiment, an environmental region of the motor vehicle 1 may be captured by an automotive camera 2. In particular, an image sequence or video data, which describes the environmental region, can be provided by the automotive camera 2. The video data may be transmitted from the camera 2 to the control unit 3. By means of the control unit 3, a display device (not shown) of the motor vehicle 1 may be controlled such that the video data of the camera 2 can be displayed to a user of the motor vehicle 1. Thus, the electronic vehicle guidance system may operate as a driver assistance system for assisting a driver of the motor vehicle 1 in driving the motor vehicle 1. Alternatively or in addition, the control unit 3 may process the video data and generate at least one control signal for one or more respective actuators (not shown) of the motor vehicle 1, which may control the motor vehicle 1 automatically or in part automatically based on the control signals.

Figure 2:
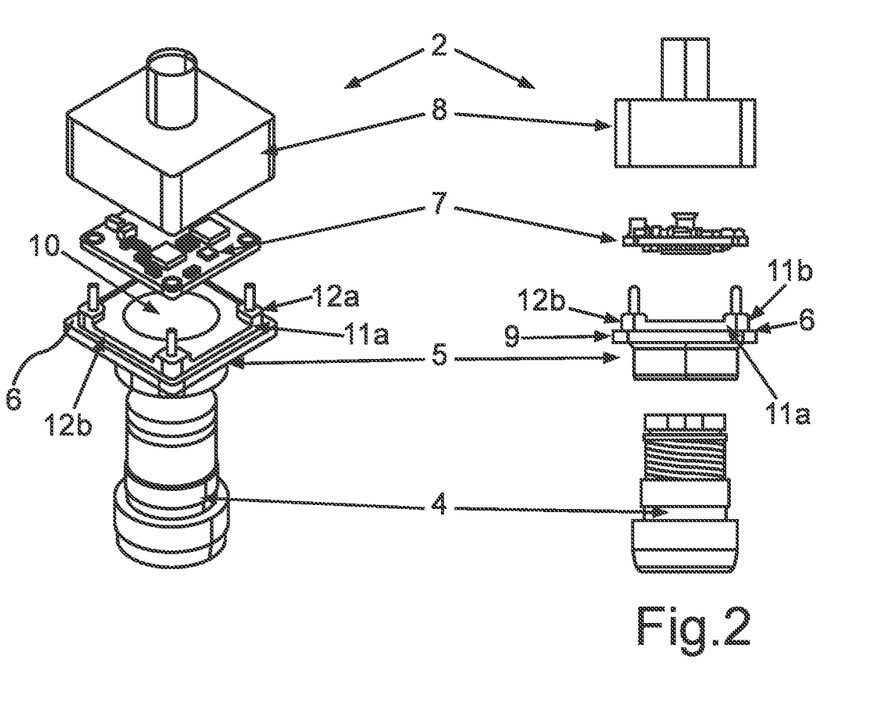
FIG. 2 shows schematically an exploded side view and an exploded perspective view of a further exemplary implementation of an automotive camera according to the invention.

FIG. 2 shows an exploded perspective view on the left and a corresponding exploded side view on the right, of an exemplary implementation of an automotive camera 2 according to the invention, which may be used in a motor vehicle 1 or the corresponding electronic vehicle guidance system described with respect to FIG. 1, for example.

The automotive camera 2 comprises a housing, which includes a first housing part, in particular a lens holder body 5, and a second housing part, in particular a rear housing body 8, which is connected to the lens holder body 5 such that an assembly space or housing interior is formed within a region enclosed by the rear housing body 8 in combination with the lens holder body 5.

The automotive camera 2 further comprises a lens unit 4 with a lens housing, which is attached to the lens holder body 5 on a side opposite to the rear housing body 8 and the assembly space. In particular, the lens housing may comprise an external thread and the lens holder body 5 may comprise an internal thread and the lens holder body 5 may be fastened to the lens housing by means of the internal thread. In alternative implementations, the lens holder body 5 may comprise an external thread and the lens housing may comprise an internal thread to connect the external thread of the lens holder body 5.

For example, the lens housing may comprise a hollow shaft, which has, for example, an approximately cylindrical inner shape and encloses one or more optical lenses of the lens unit 4 and the automotive camera 2, respectively. The optical axis of the lenses is, in particular, parallel or identical to a longitudinal axis of the hollow shaft. The longitudinal axis of the hollow shaft may therefore be considered as the longitudinal axis of the lens unit 4 and the longitudinal axis of the camera 2, respectively. It will be denoted as longitudinal axis in the following, if not denoted otherwise. For example, the external thread may be arranged on an outer side of the hollow shaft.

The lens holder body 5 may comprise a lens opening 10 formed by a through hole, which is aligned with the hollow shaft of the lens housing to allow for light entering the automotive camera 2 via the lenses and the lens housing through the hollow shaft and the through hole to enter the assembly space. Within the assembly space, a circuit board 7 of the automotive camera 2 may be arranged, which carries an imager chip (not shown) of the automotive camera 2, which is also aligned with the hollow shaft, the through hole and the optical axis as well as the longitudinal axis, respectively. Therefore, light entering the automotive camera 2 and entering, through the hollow shaft and the through hole, the assembly space may hit an active optical surface of the imager chip. The imager chip generates respective imager signals, which may be transmitted to the control unit 3 via an opening in the rear housing body 8 and a corresponding cable connection (not shown) or wireless connection. Alternatively, the circuit board 7 may comprise pre-processing circuitry, such as a digital signal processor, DSP, a microcontroller, a graphics processing unit, GPU, et cetera, to pre-process the imager signals and to provide the pre-processed imager signals to the control unit 3. The control unit 3 may then generate video data depending on the imager signals or the pre-processed imager signals, respectively.

According to the invention, the rear housing body 8 is connected to the lens holder body 5 at a flange 6 of the lens holder body 5. The flange 6 surrounds the lens opening 10, such that a step structure 9, in particular a right-angled step structure 9, surrounding the lens opening 10 is formed at an outer contour of the lens holder body 5. In particular, the step structure 9 is formed by a flange surface of the flange 6, which is perpendicular to the optical axis and faces the rear housing body 8, in combination with four side faces 11*a*, 11*b*, 12*a*, 12*b*, which are oriented away from the lens opening 10 and parallel to the optical axis and therefore perpendicular to the flange surface.

If the automotive camera 2 is assembled, the rear housing body 8, in particular an inner surface of the rear housing body 8, is in contact with a first side face 11*a* of the four side faces 11*a*, 11*b*, 12*a*, 12*b* and also with a second side face 11*b* of the four side faces 11*a*, 11*b*, 12*a*, 12*b*, which is perpendicular to the first side face 11*a*. In particular, the rear housing body 8 is, however, not in contact with the remaining two side faces 12*a*, 12*b* or, in other words, a respective spacing 14*a*, 14*b* or clearance is present between the inner surface of the rear housing body 8 and the side faces 12*a*, 12*b*, as indicated for example in FIG. 5.

Figure 3:
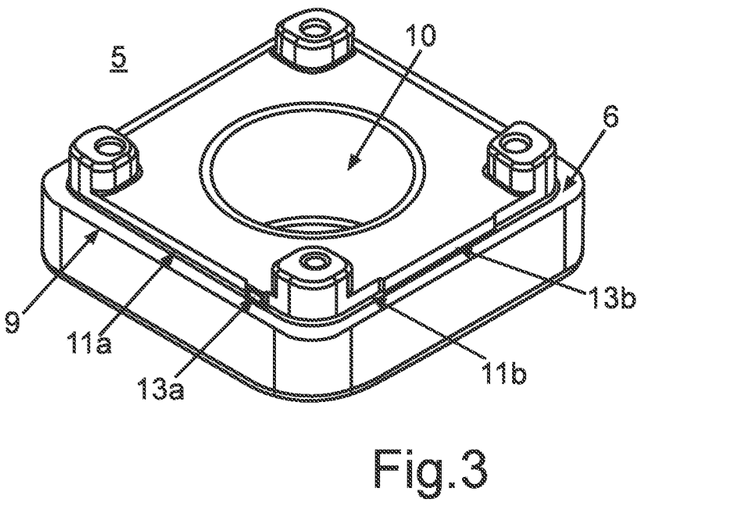
FIG. 3 shows schematically a perspective view of a first housing part of a further exemplary implementation of an automotive camera according to the invention.

FIG. 3 shows schematically a perspective view of the lens holder body 5 of a further exemplary implementation of an automotive camera 2, wherein the step structure 9 comprises a first protrusion feature 13*a* at the first side face 11*a* and a second protrusion feature 13*b* at the second side face 11*b*. A corresponding top view is given in FIG. 4. The protrusion features 13*a*, 13*b* may be considered as respective ribs extending towards the inner surface of the rear housing body 8. In particular, the rear housing body 8 is in contact with the first protrusion feature 13*a* and the second protrusion feature 13*b*, as can be seen in the additional top view of FIG. 5. On the other hand, respective spacings 14*a*, 14*b* are present between the rear housing body 8 and the third side face 11*a* and between the rear housing body 8 and the fourth side face 11*b*.

Figure 6:
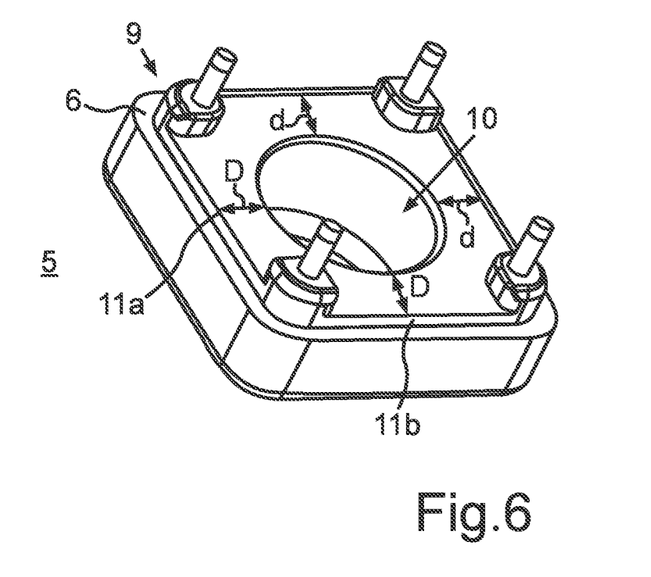
FIG. 6 shows schematically a perspective view of a first housing part of a further exemplary implementation of an automotive camera according to the invention.

In an alternative implementation, which is depicted schematically in the perspective view of the lens holder body 5 of a further exemplary implementation of an automotive camera 2 in FIG. 6, the step structure 9 does not comprise the protrusion features 13*a*, 13*b* but the first and the second side face 11*a*, 11*b* have a plane surface, respectively. Nevertheless, the respective wall thickness D between the lens opening 10 and the first side face 11*a* and the second side face 11*b*, respectively, is greater than the wall thickness between the lens opening 10 and the third side face 12*a* and the fourth side face 12*b*, respectively. In other words, the width of the flange 6 is smaller at the first and the second side face 11*a*, 11*b* compared to the thickness of the flange 6 at the third and the fourth side face 12*a*, 12*b*. Therefore, also in these implementations, the rear housing body 8 is in contact with the first and the second side face 11*a*, 11*b* while still the spacings 14*a*, 14*b* are present between the third side face 12*a* and the rear housing body 8 and between the fourth side face 12*b* and the rear housing body 8, respectively.

Figure 4:
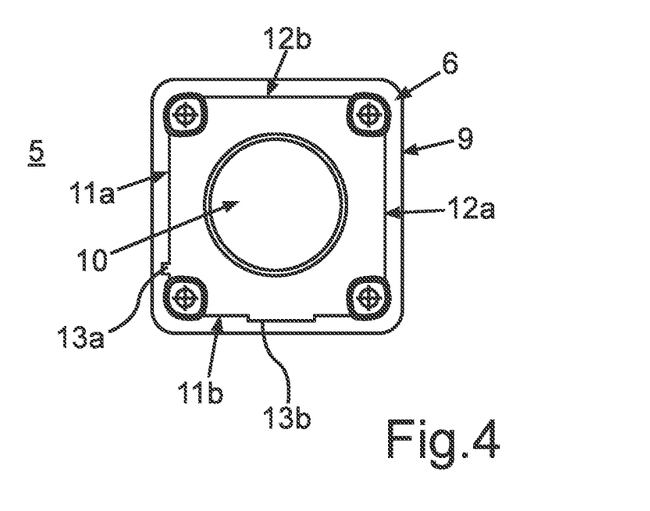
FIG. 4 shows schematically a top view of the first housing part of FIG. 3.
Figure 5:
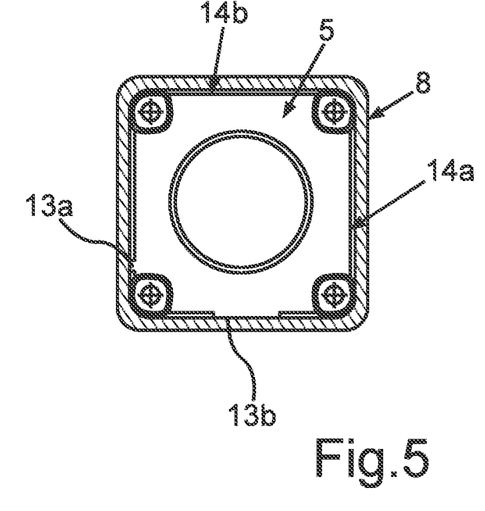
FIG. 5 shows schematically a top view of the first housing part of FIG. 3 and a corresponding cut view of a second housing part of the automotive camera.

During manufacturing, grippers may be used to push the rear housing body 8 into contact with the protrusion features 13*a*, 13*b* of the lens holder body 5 in implementations as in FIG. 3 to FIG. 5 or into contact with the locating side faces 11*a*, 11*b* in implementations as in FIG. 6. This helps to position the rear housing body 8 relative to the lens holder body 5. The side face 11*a*, 11*b* or, if present the protrusion features 13*a*, 13*b*, can also be used as a laser welding overlap region. The laser welding overlap region may understood as the region where the laser welds over a section which has been previously welded. It is typically a sensitive area of the process, and it can be beneficial to have a locally increased wall thickness to prevent material eruption.

The fitup of the outside of the rear housing body to the outside of the lens holder body can be a critical factor for laser welding. According to the invention, the rear housing body and the lens holder body may be located more exactly, which reduces variations in the fitup. Corresponding features may for example also be used for the laser welding process.

The invention claimed is:

1. An automotive camera comprising:
    a first housing part and a lens unit, which is connected to the first housing part at a lens opening of the first housing part;
    a second housing part, which is connected to the first housing part, such that a housing interior is formed; and
    a circuit board arranged within the housing interior;
    wherein the second housing part is connected to the first housing part at a flange of the first housing part, which surrounds the lens opening such that a step structure surrounding the lens opening is formed at an outer contour of the first housing part, wherein the step structure comprises four side faces, which are oriented away from the lens opening,
    wherein the second housing part is in contact with a first side face of the four side faces and the second housing part is in contact with a second side face of the four side faces, which is perpendicular to the first side face,
    wherein the step structure comprises a first protrusion feature at the first side face and the second housing part is in contact with the first side face at the first protrusion feature, and
    wherein the step structure comprises a second protrusion feature at the second side face and the second housing part is in contact with the second side face at the second protrusion feature.

2. The Automotive camera according to claim 1, wherein a spacing is present between the second housing part and a third side face of the four side faces and a further spacing is present between the second housing part and a fourth side face of the four side faces, which is perpendicular to the third side face.

3. The Automotive camera according to claim 2, wherein:
    a first wall thickness of the first housing part between the first side face (11*a*) and the lens opening is greater than a third wall thickness (d) of the first housing part between the third side face and the lens opening,
    the first wall thickness (D) is greater than a fourth wall thickness (d) of the first housing part between the fourth side face and the lens opening,
    a second wall thickness (D) of the first housing part between the second side face and the lens opening is greater than the third wall thickness (d), and
    the second wall thickness (D) is greater than the fourth wall thickness (d).

4. The Automotive camera according to claim 1, wherein the first housing part and the second housing part are connected to each other by laser welding.

5. The Automotive camera according to claim 1, wherein
    the first housing part and the second housing part consists of a metal, respectively, or
    the first housing part comprises a first metal component, which comprises the flange, and the second housing part comprises a second metal component, wherein second metal component is connected to the flange.

6. A motor vehicle comprising an automotive camera according to claim 1.

7. A method for manufacturing an automotive camera, wherein:
- connecting a first housing part, which comprises a lens opening for attaching a lens unit of the automotive camera, and a second housing part to each other at a flange of the first housing part, such that a housing interior is formed,
- wherein the flange surrounds the lens opening such that a step structure surrounding the lens opening is formed at an outer contour of the first housing part, wherein the step structure comprises four side faces, which are oriented away from the lens opening; and
- before the second housing part is connected to the first housing part, bringing the second housing part into contact with a first side face of the four side faces and the second housing part is brought into contact with a second side face of the four side faces, which is perpendicular to the first side face.

8. The method according to claim 7, for bringing the second housing part into contact with the first side face and the second side face, the first housing part and the second housing part are moved relative to each other within a plane, which is perpendicular to the first side face and the second side face.

9. The method according to claim 7, wherein the first housing part and the second housing part are arranged with respect to each other, such that a spacing is present between the second housing part and a third side face of the four side faces and a further spacing is present between the second housing part and a fourth side face of the four side faces, which is perpendicular to the third side face.

10. The method according to claim 7, wherein the first housing part and the second housing part are connected to each other by laser welding.

11. The method according to claim 7, wherein a first wall thickness of the first housing part between the first side face and the lens opening is greater than a third wall thickness of the first housing part between the third side face and the lens opening, and wherein a second wall thickness of the first housing part between the second side face and the lens opening is greater than a fourth wall thickness of the first housing part between the fourth side face and the lens opening, and the laser welding is carried out along a contour of the flange, wherein the first wall thickness is present at a welding overlap region.

12. The method according to claim 7, wherein the first housing part is produced by an extrusion process or by a molding process.

* * * * *